United States Patent [19]

MacAnally et al.

[11] Patent Number: 4,752,922

[45] Date of Patent: Jun. 21, 1988

[54] OPTICAL DISK RECORDING AND READOUT SYSTEM HAVING READ, WRITE AND COARSE LIGHT BEAMS

[75] Inventors: Richard B. MacAnally; Brad R. Reddersen; James W. Baer; Charles Reilly; Scott L. DeVore, all of Boulder County; Scott D. Wilson, Adams County, all of Colo.

[73] Assignee: Storage Technology Partners 11, Louisville, Colo.

[21] Appl. No.: 628,196

[22] Filed: Jul. 6, 1984

[51] Int. Cl.[4] ............................................. G11B 7/095
[52] U.S. Cl. ...................................... 369/32; 369/44; 369/110; 369/111; 369/112; 369/45; 369/46
[58] Field of Search ................... 369/32, 44, 110, 111, 369/112, 122, 109, 45, 46, 120; 365/215, 234; 346/76 L; 250/202

[56] References Cited

U.S. PATENT DOCUMENTS

| | | | |
|---|---|---|---|
| 3,314,073 | 4/1967 | Becker | 446/76 L |
| 3,962,721 | 6/1976 | De Hann | 358/4 |
| 3,983,317 | 9/1976 | Glorioso | 369/112 |
| 4,059,841 | 11/1977 | Bricot | 369/46 |
| 4,094,010 | 6/1978 | Pepperl | 365/215 |
| 4,198,701 | 4/1980 | Reddersen | 365/127 |
| 4,243,850 | 1/1981 | Edwards | 369/109 |
| 4,290,132 | 9/1981 | Kotaka | 369/46 |
| 4,305,081 | 12/1981 | Spong | 369/275 |
| 4,330,880 | 5/1982 | Van Dijk | 369/32 |
| 4,334,299 | 6/1982 | Komurasaki | 369/44 |
| 4,363,116 | 12/1982 | Kleuters | 369/30 |
| 4,399,529 | 8/1983 | Leterme | 369/112 |
| 4,467,467 | 8/1984 | Wilkinson | 369/112 |
| 4,507,763 | 3/1985 | Kato | 369/44 |

*Primary Examiner*—Alan Faber
*Attorney, Agent, or Firm*—Woodcock, Washburn, Kurtz, Mackiewicz & Norris

[57] ABSTRACT

An optical system for writing and reading data from a rotating optical storage disk, comprising a first, second and third coherent light source, providing coarse seek, reading, and writing functions, the three writing sources sharing a plurality of optical elements in common, all cooperating to provide for the coarse seek, fine seek, focus and tracking functions of the device. The read and the write optical beams are optically coupled together to ensure proper spacing of a newly written track with regard to the previously written track.

40 Claims, 10 Drawing Sheets

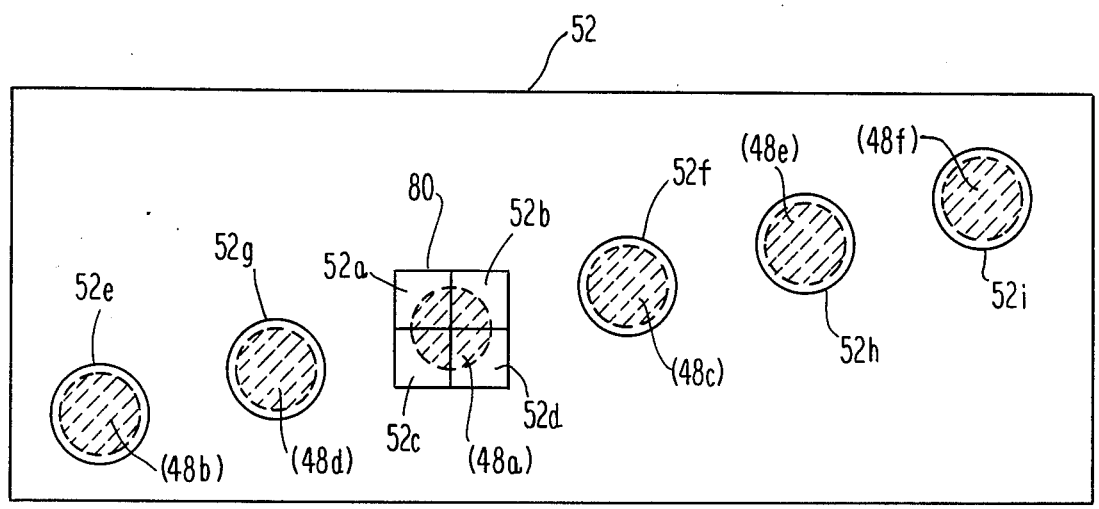
_Fig. 9_
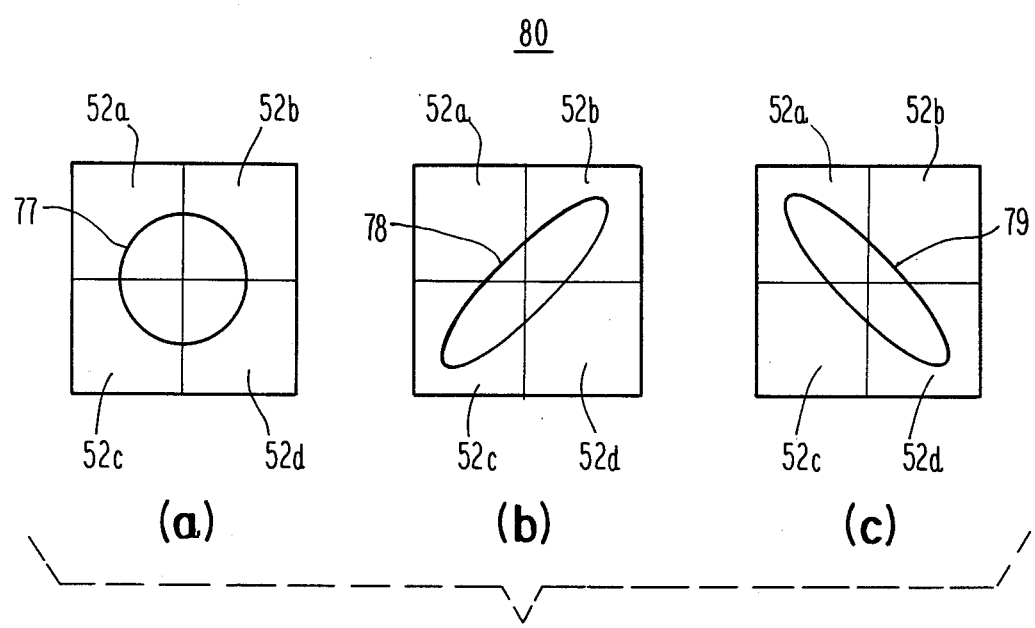
_Fig. 10_

OPTICAL DISK RECORDING AND READOUT SYSTEM HAVING READ, WRITE AND COARSE LIGHT BEAMS

BACKGROUND OF THE INVENTION

The disclosed invention relates to the field of the optical storage of analog or digital data and, in particular, to high density storage of analog or digital information on an optical recording disk having separate optical paths for read, write and coarse seek beams.

It is well known in the art to use a modulated and focused radiation beam, usually a laser, to record both digital and analog information on a recording surface. See e.g., U.S. Pat. No. 3,314,073, issued to Becker on Apr. 11, 1967. For example, there have been a number of different means taught for providing proper focus of the incident read beam on the disk surface, including focusing systems wherein light is diffracted by the tracks on the disk surface and, the diffracted beams then focused on independent photo-sensitive elements.

While phase diffracted reflected beams have been used to detect focus error, astigmatic focus systems have generally been the system most favored to provide focus information. To accomplish this, a cylindrical lens is used to astigmatize the beam reflected from (or transmitted through) the optical recording media. The astigmatized beam thereafter provides a spot having two focal points, which are detected by a quad detector system. With an astigmatic focus system, the device is in focus when the circle of least confusion is properly focused on the detectors. The quad detector, in response to the pattern focused thereon, generates control signals. For example, see e.g., U.S. Pat. No. 4,290,132, issued Sept. 15, 1981, to Kotaka; U.S. Pat. No. 4,059,841, issued to Bricot et al.; and U.S. Pat. No. 3,962,721, issued June 8, 1976, to deHaan.

Likewise, tracking of the device beams over the disk surface has generally followed well known techniques. In random access devices using disk shaped carriers, it has generally been necessary to provide for the gross (coarse) translation of the optical elements over the disk surface from one area of the disk to another. This has generally been accomplished by mounting the optics in a carriage actuator. Relatively widely spaced coarse servo tracks are then used to determine actuator and optical head position as the actuator moves across the disk surface. See e.g., U.S. Pat. No. 4,094,010, issued June 6, 1978, to Pepperl et al., teaching the placement of a plurality of concentric coarse seek tracks on a disk surface.

In addition to coarse seek movement over the disk surface, fine seek movement from track to track is necessary. For proper operation, the coarse seek and the fine seek tracking components must cooperate, not only in seeking a new location, but also in maintaining proper tracking once the proper track is attained. See U.S. Pat. No. 4,330,880, issued May 18, 1982, to Van Dijk.

For fine tracking of the focused beam over the disk surface, prior devices have taught the use of a pair of tracking spots focused on opposite edges of a track, and comparing the strength of the reflected signals. For example, see U.S. Pat. No. 4,243,850, issued Jan. 6, 1981, to Edwards; U.S. Pat. No. 4,305,081, issued Dec. 8, 1981, to Spong; and U.S. Pat. No. 4,059,841, issued Nov. 22, 1977, to Bricot et al.

In recent years, there has been increased interest in the development of optical storage devices which can record as well as read optical information. See e.g. U.S. Pat. No. 4,363,116, issued Dec. 7, 1982, to Kleuters et al., wherein a single laser is used to both record data on, and to read data from, the disk surface. However, there has also been increased interest in the use of multi-laser systems for both reading and writing. See U.S. Pat. No. 4,198,701, issued Apr. 15, 1980, to Reddersen et al., and U.S. Pat. No. 4,334,299, issued June 8, 1982, to Komurasaki et al,. When writing new data tracks on a disk surface, it is usually necessary to track on a previously written track because ordinarily it is quite difficult to maintain proper track spacing while writing on the present track. In multi-laser recording systems, it is more efficient to both combine the read and write beams so that they can share some part of the optical path and corresponding elements.

While earlier developments have embodied some of the basic concepts, they suffered from an inability to combine all these elements into a single working optical device for both recording and reading high density data. The present invention answers an unmet need for a specific implementation of all the diverse optical elements necessary to generate coarse seek tracking, fine tracking, focusing, and data reading means, all coupled to a means for writing new data on the disk.

The prior developments have not been able to systematically combine all of the disparate elements needed for a coarse seek read and write device into a single working set of optical elements. The known teachings have also been unable to provide a completely integrated means for combining a plurality of optical paths into a single path, thus simplifying the optics. The disclosed invention addresses this problem by disclosing a complete optical system for recording and reading optical media. This is accomplished by both improving upon the previously known concepts and by developing new concepts, which together provide an optical system that is able to generate and transmit to the recording surface, complete means for recording and reading optical data. The disclosed invention provides an integrated system, teaching the use of coarse seek, write and read optical trains (a train being the set of optical elements used to direct the beam along its optical path). More particularly, the disclosed invention teaches the efficient combination of all three beams so as to share some number of optical elements in common.

It is an object of the disclosed invention to provide an optical system for reading and writing data in an optical information storage system.

It is another object of the disclosed invention to provide a means for combining a coarse seek, read and write optical train into a single optical information storage device.

It is yet another object of the disclosed invention to provide a means for selectively combining and separating the coarse seek, read and write optical trains, so that the beams can share a number of optical elements in common.

BRIEF SUMMARY OF THE INVENTION

The present invention discloses a means for recording and reading digital information in a random access optical storage device having interchangeable media. In the preferred embodiment, the optical disk is pre-formatted having a plurality of coarse servo tracks pre-recorded on the disk surface. User data is written in the "band" which is the area between the coarse servo tracks. Associated with each band is a home address track. The home address track identifies that specific band.

The present invention incorporates three interlinked optical systems and provides: a coarse seek optical system which delivers a coarse seek beam to the disk surface and provides a signal which is used to control movement of the device actuator to a pre-selected band on the disk surface; a read optical system for reading data from the surface, the read system having the primary means for focusing and tracking of the read and write beams over the disk tracks, and; a write optical system for writing user data on the disk surface, the write beam modulated in response to the user data to be recorded.

The invention is comprised of a plurality of fixed and servo coupled optical elements which together form coarse seek, read, and write optical trains, and respectively shape, manipulate, focus and track the coarse seek, the read and the write beams onto the disk surface. The coarse seek and the read beams are reflected from the disk surface and transmitted to detectors for servo control of the coarse and fine tracking, and read functions. The write beam is optically coupled to the read beam in order to write new user data tracks properly spaced with regard to the previously written adjacent track.

In operation, the coarse seek beam travels through the coarse seek optical train to reflect the beam off the disk surface. As the beam is reflected by the coarse seek tracks, a signal is produced which is received by a coarse seek detector. The coarse seek detector generates a signal to a coarse seek servo system which drives the device actuator to center the optical head over that band. The device read beam, passing through the read optical element train, detects the home address track so as to identify which band the head is located. This process continues until the desired band is located. To read a home address track, the read beam tracking and focusing and reading functions described below are used.

The coarse seek path to the disk surface originates at a coarse seek laser diode which is placed off center with respect to the device objective lens and emits a first wavelength, S-polarized light beam. The coarse seek beam emitted by the coarse seek diode is collimated by a first collimating lens system. The beam is then formed into a line focused beam. The coarse seek beam is then reflected by a subaperture mirror, which acts to split the incident beam from the reflected coarse seek beam. The coarse seek beam is then transmitted through a first wavelength selective beamsplitter which combines the incident coarse seek beam with the read and write beams, discussed below.

The reflected coarse seek beam passes back through the coarse seek optical train to pass under the subaperture mirror to be focused upon the coarse seek detector. The coarse seek detector generates a signal which, when processed by known circuitry, provides a coarse servo tracking signal to the device actuator which radially translates the moving optics over the disk surface. A first, wavelength selective filter is disposed in the coarse seek return path to prevent any stray read or write beam from falling on the coarse seek detector.

In the preferred embodiment, once the pre-selected band has been located, the read beams provide focus, tracking and read information to the read beam detectors. These detectors in turn provide servo signals to tracking and focus servo motors for fine tracking and focus adjustments, as well as reading user data.

The read beam, is a second wavelength, S-polarized laser beam. In the read optical train, the read beam is first transmitted through a second, neutral density, filter to standardize the power of the read beam. The read beam is then transmitted through a complex grating subassembly, which divides the read beam into six separate beams. These beams are then collimated and expanded by the read beam collimating telescope lens subassembly. The read beams then pass through a first polarization beamsplitter, where the S-polarized read beams are then reflected toward a second, wavelength selective, read/write beamsplitter. The read beams are thereafter transmitted through an amplitude beamsplitter, which directs a small percentage of the read, (and as discussed below, the write beam) out of the main optical path to a write alignment detector. The amplitude beamsplitter is not wavelength selective.

The main read beams are transmitted through the amplitude beamsplitter and are reflected by a fine seek radial tracking actuator which directs the read beams to a read-write/coarse seek combiner. The read beams are then reflected by the first wavelength selective beamsplitter to thereafter share the same optical path with the coarse seek beam.

The read and coarse seek beams are transmitted through a rhomb prism for rotation of the read beam polarization. The beams are then reflected by a fourth planar mirror to a set of moving carriage optics, which include a second, imaging/beam shaping telescope, and the device objective lens for focusing the beams on the disk surface.

The coarse seek and read beams reflected from the disk surface are collected by the objective lens and are transmitted back through the optical train. As discussed above, the first wavelength selective beamsplitter splits the reflected coarse seek beam from the reflected read beam. Due to the 90 degree rotation of polarization caused by twice passing through the rhomb prism, the returning read beams are transmitted through the first, polarization sensitive read beamsplitter. The transmitted beams are then pass through an astigmatic lens system and a second cylindrical lens, which focus read spots on the read detector system. A third, wavelength selective filter is located between the cylindrical lens and the detectors to filter any stray write or coarse seek light which might have migrated through the system.

The write beam, modulated in accord with the user data, is emitted by a diode laser having a third, P-polarized, wavelength. In the write optical train, the write beam is collected and partially collimated by a first write beam collimating subsystem and transmitted through an optical shutter which is selectively operated to reduce the write beam intensity. The diode laser issues an astigmatic divergent beam with an elliptical cross section. Since a diffraction limited circular spot is necessary for writing, the beam is circularized by a prism beam expander lens system. The prism beam expander also advantageously de-astigmatizes the write beam. The beam is then fully collimated and expanded by a write beam second collimating subsystem.

The expanded beam then impinges on a write alignment actuator. The write beam is coupled to the read beams so that when new user data is to be written, the focus and tracking information provided by the read beam on the "previously written" track guides the write beam as it writes the "present" track. The write alignment actuator directs the write beam to a second polarization beamsplitter. The P-polarized beam is transmitted through the second polarization beamsplitter to the second, wavelength selective beamsplitter. Thereafter, the coarse seek, read and write beams all share a common path to the disk surface.

Any write beam which is reflected by the disk, collected by the objective lens, and transmitted back through the write optical path, is rotated by the rhomb prism, where the 90 degree rotation causes any returning write beam to be reflected by the second polarization beamsplitter to pass onto an absorber, which impedes any further travel of the write beam.

BRIEF DESCRIPTION OF THE DRAWINGS

FIG. 8a shows an optical disk having a plurality of coarse servo tracks. FIG. 8b shows a band located between two coarse servo tracks, having recorded therein a plurality of user data tracks. FIG. 8c is a further expanded section to show two tracks from the disk, the tracks having located thereon a write spot and six read spots.

FIG. 9 is a pictorial representation of the preferred embodiment of the read detector array including the focusing tracking and data detectors.

FIGS. 10a-10c are pictorial representations of the reflected focusing beam spot pattern on the quad detector set, with FIG. 10a showing the spot on the detector when the objective lens is properly focused on the disk; FIG. 10b showing the objective lens out of focus in a first direction, and; FIG. 10c showing the objective lens out of focus in a second direction.

FIG. 14a depicts the read beam only on the detector during initial alignment. FIG. 14b depicts the read and the write beams focused on this detector for comparison.

DETAILED DESCRIPTION OF THE PREFERRED EMBODIMENT

To better understand the functioning of the elements of the coarse seek, read and write optical trains in the preferred embodiment of the disclosed invention, each optical path will be discussed separately. However, it should be understood that the optical trains share a number of optical elements in common. Both a schematic and a series of pictorial diagrams will be used.

COARSE SEEK OPTICAL PATH

Figure 1:
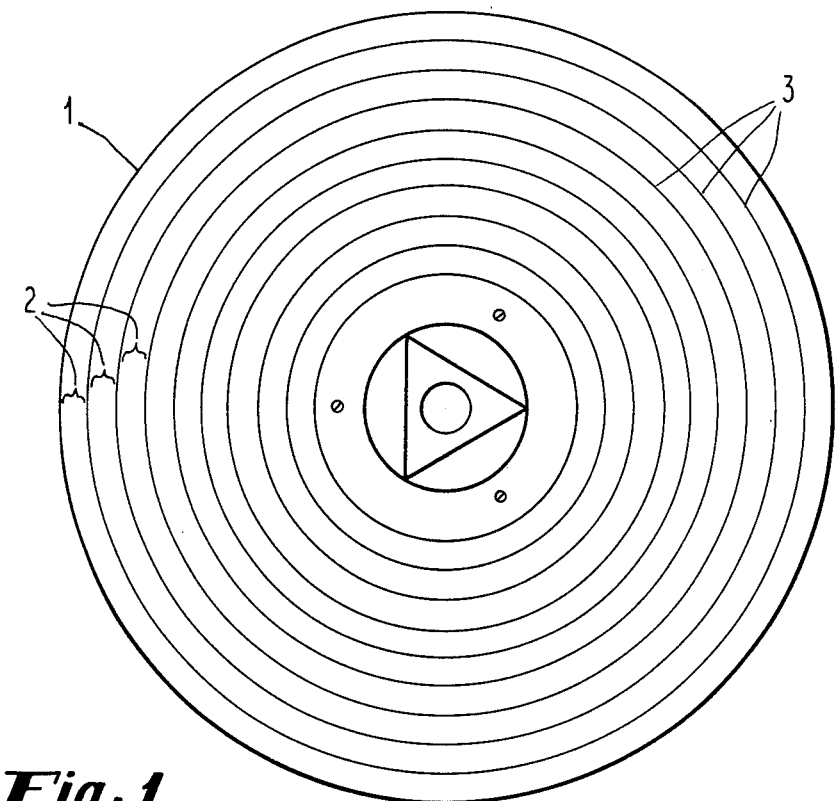
FIG. 1 is a top view of an optical disk for use in the optical storage device having interchangeable media as contemplated by the preferred embodiment of the disclosed invention, said disk having a plurality of coarse seek tracks, said tracks having located there between bands upon which user data can be recorded.
Figure 2:
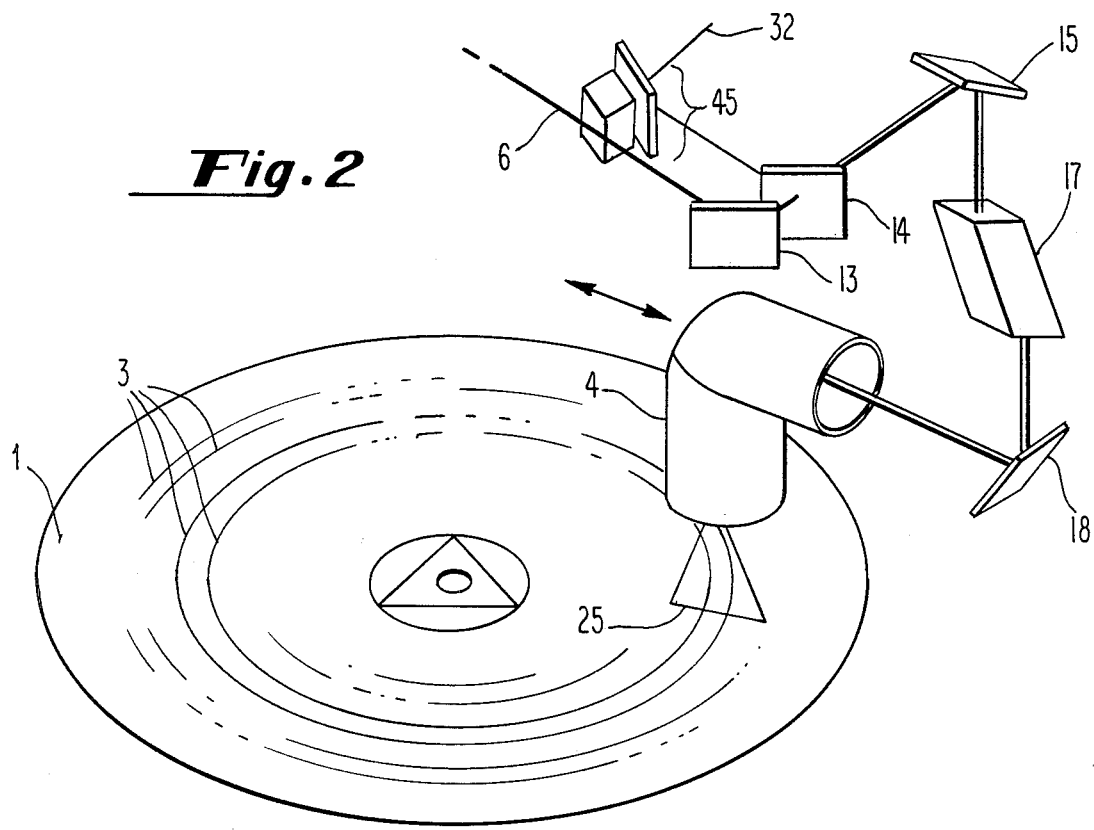
FIG. 2 is a perspective representation of a portion of the device optical path, particularly showing that part of the device coarse seek servo actuator which radially translates the moving portion of the read, the write and the coarse seek optical trains over the disk surface.

As shown in FIG. 1, the disk, rotated by well known means, has a plurality of concentric bands 2, bound by a plurality of concentric coarse servo tracks 3. Each coarse servo track 3 has associated therewith, a home address track (not shown), each home address track containing format information, uniquely identifying the band 2. However, prior to the device being able to read a given home address track, the device must be appropriately located over that coarse servo track 3. As shown in FIG. 2, a coarse tracking servo system (not shown) senses the coarse servo track 3 and positions the device actuator 4, a coarse seek radial translation means, containing the moving carriage optics, over the preselected coarse servo track 3.

Figure 3:
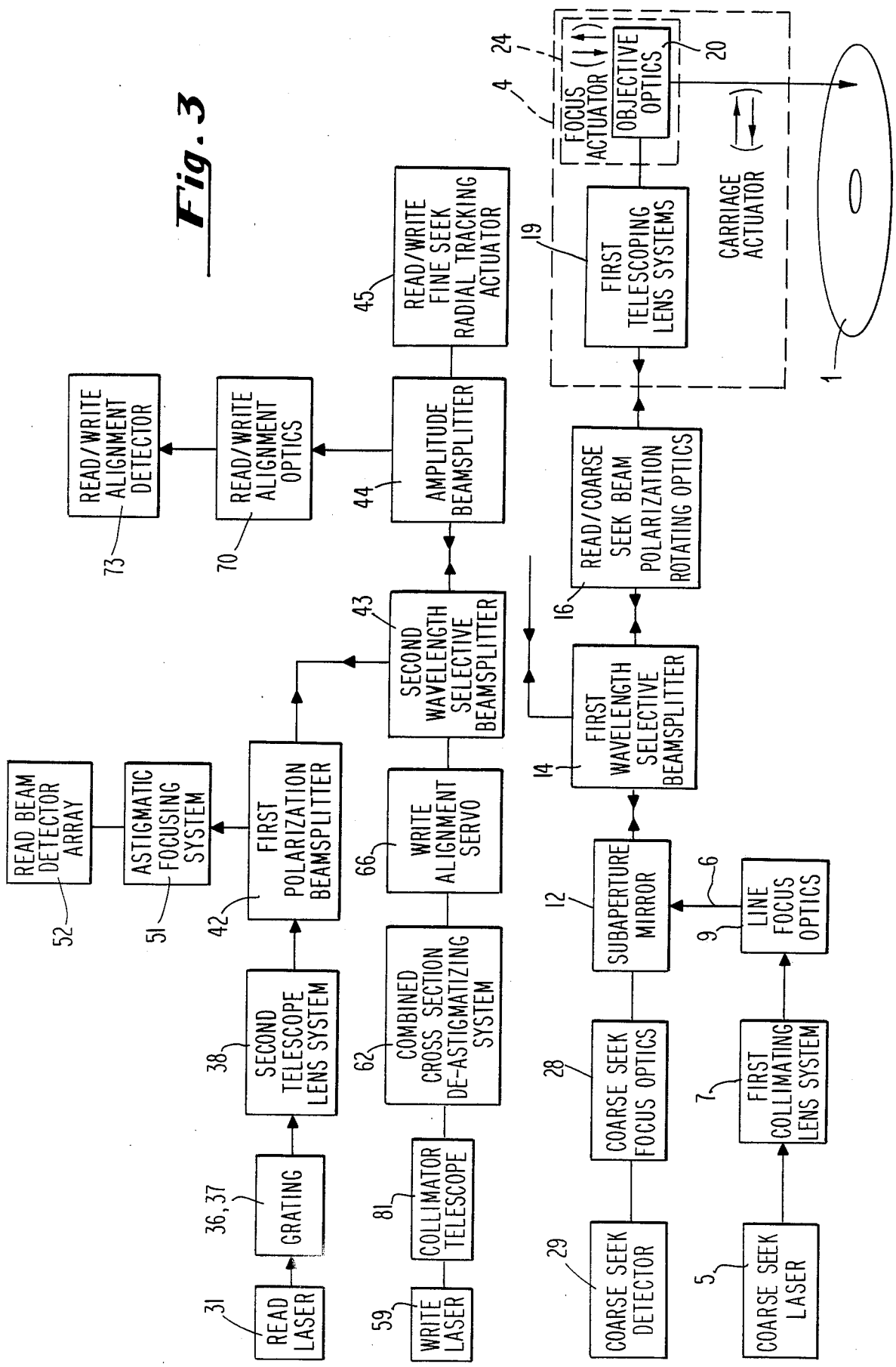
FIG. 3 is a block diagram showing the functional relationships of coarse seek, the read and the write optical paths.
Figure 4:
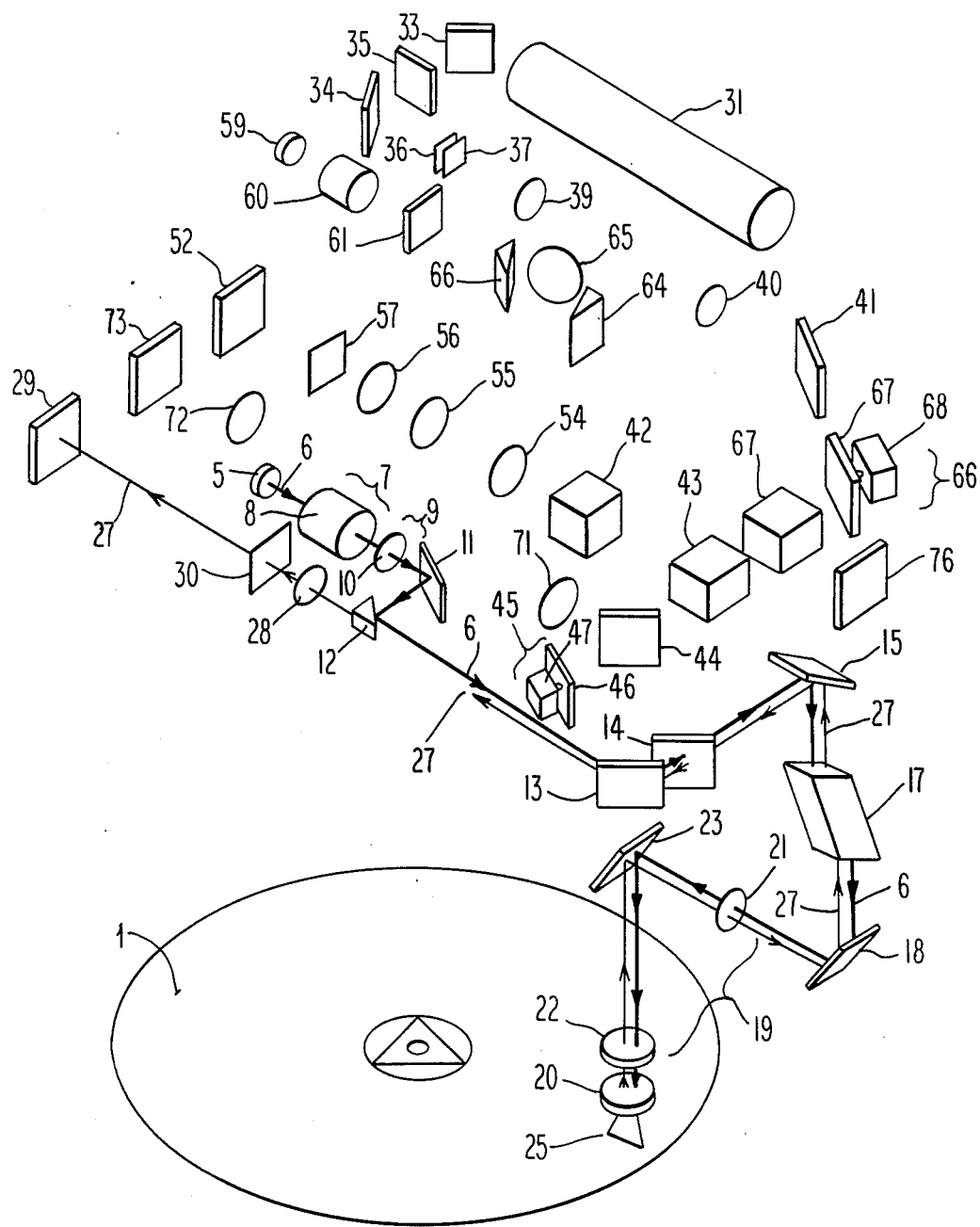
FIG. 4 is a perspective representation of the coarse seek, read, and write optical train elements, specifically showing the optical path of the coarse seek beam from the coarse seek diode laser to the disk surface, with the reflected coarse seek beam returning to a coarse seek detector.

As shown in FIGS. 3 and 4, in operation, a first coarse seek laser diode 5, emits a coherent, S-plane polarized, 780 nanometer wavelength, beam 6. In the preferred embodiment, the coarse seek diode is mounted so that the coarse seek beam follows a first path that is off the optical axis of the device objective lens 20 so that the incident coarse seek beam 6 only passes through the upper "subaperture" of the objective lens 20. The coarse seek beam 6 first passes through a first collimating lens system 7. In the preferred embodiment, this first collimating lens system 7 is comprised of a first compound spherical lens 8, which nominally collimates the diverging, coherent light beam 6 emitted by the diode laser 5. The now collimated coarse seek beam 6 thereafter enters a line focus optics 9, in order to provide a line focused spot 25 on the disk 1 surface. In the preferred embodiment the line focus optics system 9 is a first cylindrical lens 10, which astigmatizes the coarse seek beam 6. This line focused spot 25 is necessary for the proper operation of the coarse servo tracking system.

The coarse seek beam 6 is then reflected off a first planar mirror 11 onto a first subaperture mirror 12. The subaperture mirror 12 is positioned to intercept and deflect the incident coarse seek beam 6 toward a second planar reflecting mirror 13. Since the coarse seek beam path is off-set upward with respect to the center axis of the objective lens 20, the incident beam is deflected by subaperture mirror 12. Upon reflection from the disk 1, the return coarse seek beam 27 will be off-set below the center axis of the objective lens, passing undeflected below the subaperture mirror 12.

As shown in FIGS. 3 and 4, the deflected incident coarse seek beam 6 thereafter impinges upon a first, wavelength selective beamsplitter 14. The thin film coating on the first wavelength beamsplitter 14 selectively transmits the first wavelength coarse seek beam 6, but will reflect a second and a third wavelength beam (as discussed below). The coarse seek beam 6 is thereafter reflected off of a third planar mirror 15. This mirror 15 is oriented at the appropriate angle so as to deflect the coarse seek beam 6 down toward a polarization rotating means 16, which in the preferred embodiment, is a Fresnel rhombial-shaped (rhomb) prism 17.

The coarse seek beam 6 is thereafter reflected by forth planar mirror 18 which is oriented to deflect the coarse seek beam 6 at approximately a 90 degree angle from a vertical to a horizontal path. The incident coarse seek beam 6 thereafter impinges upon a first telescope system 19. As shown in FIG. 4, in the preferred embodiment, the first telescoping lens system 19 is comprised of a first infinite conjugate achromatic doublet lens 21, a second infinite conjugate achromatic doublet lens 22, and a fifth planar mirror 23. The fifth planar mirror 23 disposed between the first 21 and second 22 lens and is positioned to deflect the beam 6 from a horizontal path to a vertical path down toward the objective lens 20. In the preferred embodiment, the first doublet lens 21 has a focal length of 86.4 mm, while the second doublet lens 22 has a focal length of 39.3 mm. The positions of the lens 21 and 22 relative to the remaining coarse seek optical elements and to each other are adjusted to produce the appropriate coarse seek beam 6 imaging on the disk surface.

Figure 5:
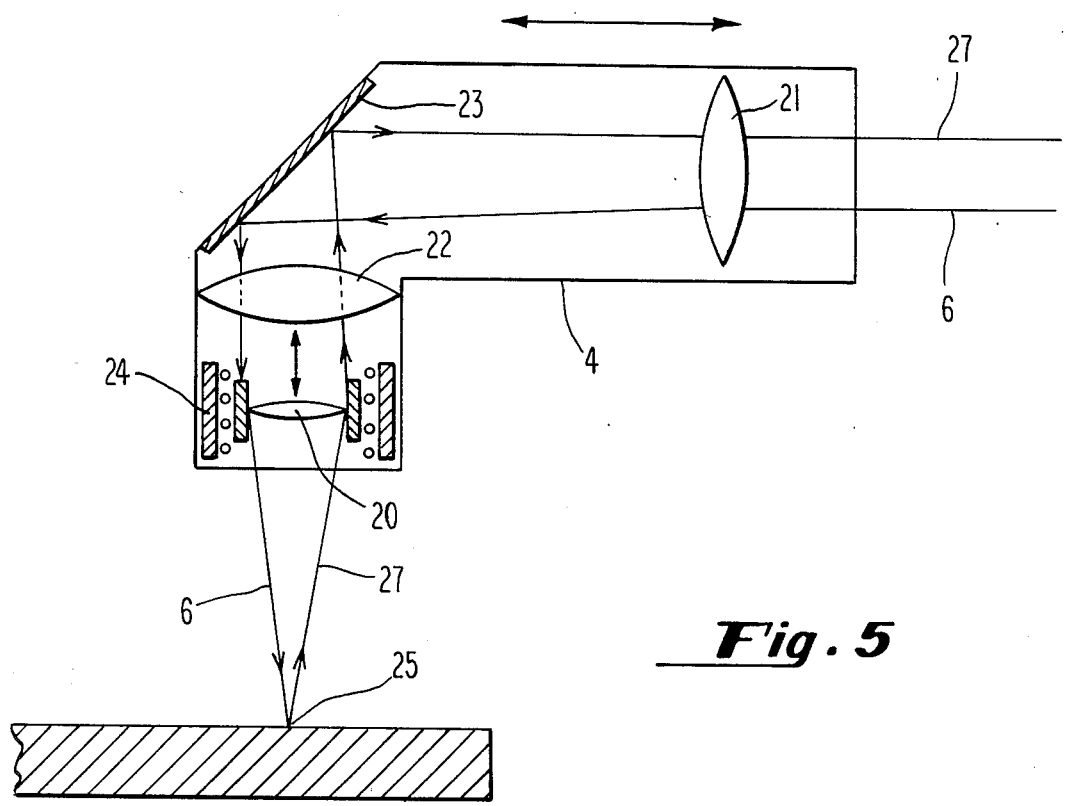
FIG. 5 is a side cut-away view of the coarse seek servo actuator, showing the moving optical train elements.

As shown in FIG. 5, in the preferred embodiment, the first infinite conjugate doublet lens 21, the planar mirror 23 and the second infinite conjugate doublet lens 22 are part of the moving optics and are disposed in the coarse seek actuator 4. This allows the coarse seek actuator to be moved relatively large distances across the disk 1 surface with relatively small changes in the image focus at the disk 1 surface.

As shown in FIG. 5, the coarse seek beam 6 exits the first infinite conjugate lens 21, to impinge upon the fifth planar mirror 23. The beam 6 thereafter is deflected 90 degrees down toward the second infinite conjugate lens 22. The coarse seek beam 6, after leaving the second infinite conjugate lens 22. enters the entrance pupil of the objective lens 20. It should be noted that the fifth planar mirror 23 has no effect upon the operation of the first and second infinite conjugate lens 21 and 22 operating as a first beam-expanding telescoping lens system 19.

The objective lens 20, is mounted in a voice coil motor 24, an objective lens focus translation means, which translates the objective lens 20 normal to the disk 1 surface in response to a signal from servo control means (not shown). In the preferred embodiment, the objective lens 20 has a numerical aperture of 0.60 and an entrance pupil diameter of 4.22 mm.

Figure 6:
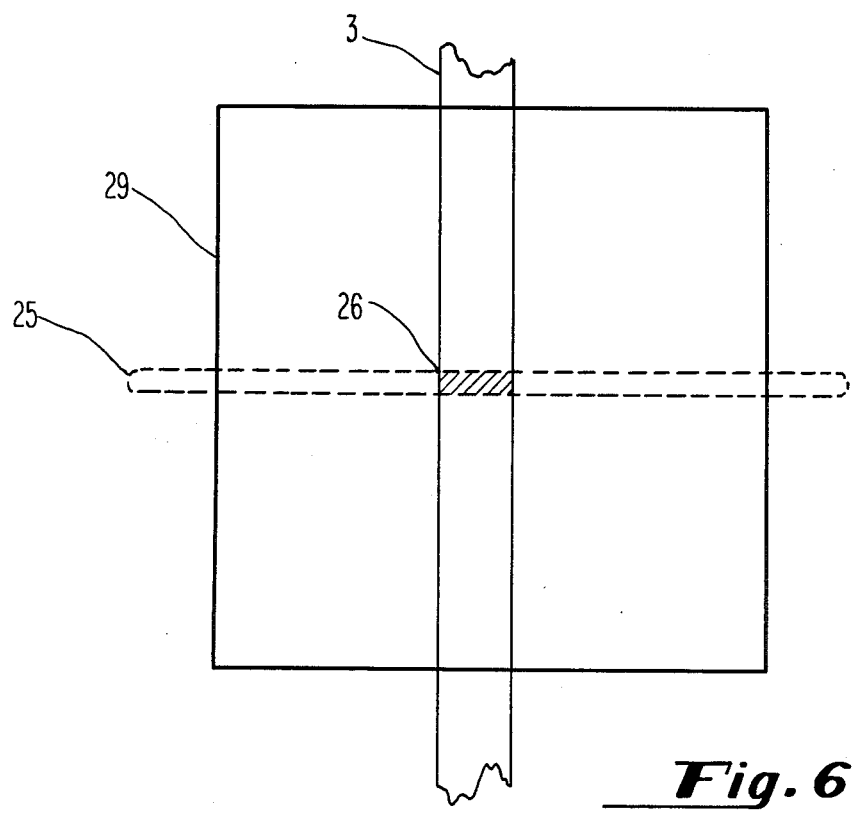
FIG. 6 shows a representative pattern of the reflected coarse seek beam on the coarse seek detector of FIG. 4 as contemplated in the preferred embodiment of the disclosed invention.

As shown in FIGS. 2, 4 and 6, the coarse seek beam 6 forms a focused line 25 on the disk 1 surface. As shown in FIG. 6, because the line focused coarse seek beam 6 intersects the coarse seek track 3 in the cross section area only, a "spot" 26 is essentially reflected from the disk 1 surface back through the coarse seek optical train.

The reflected coarse seek beam 27 passes back through the second 22 and first 21 infinite conjugate lenses, the fifth planar mirror 23, the fourth planar mirror 18, back through the rhomb 17. The reflected coarse seek beam 27 thereafter is deflected by the third planar mirror 15 toward the first, wavelength selective beamsplitter 14, which selectively transmits the coarse seek beam 27 through to the second planar mirror 13. The second planar mirror 13 deflects the coarse seek beam 27 back along the lower coarse seek optical path toward the subaperture mirror 12, which is positioned to allow the off-axis coarse seek beam 27 to pass deflected under the aperture mirror 12. The coarse seek beam 27 thereafter impinges on a second spherical lens 28, which focuses the reflected coarse seek beam 27 onto a first detector 29. However, in the preferred embodiment, disposed before the second spherical lens 28 is a first, wavelength selective filter 30, which selectively transmits only light of the coarse seek beam 27 wavelength, absorbing any read or write beams of a second and third wavelength, should any have been transmitted through the wavelength selective beamsplitter 14.

As shown in FIG. 6, the reflected coarse seek beam 27 impinges upon the coarse seek detector 29, with reflected beam 27 forming a spot 27 on the detector 29. In the preferred embodiment, the coarse seek detector 29 is a one dimensional, position sensing, detector of the type well known in the art. In the preferred embodiment, the detector 29 is manufactured by United Detector Technology, Model SC-5D, having an active area 2.54 mm long by 2.54 mm wide. When the actuator 4 is correctly centered over a coarse seek track 3, a null signal is generated. However, when the coarse seek actuator 4 is not centered over a coarse seek track 3, a position error signal is generated, which is sent to a servo control device, well known in the art, which generates a signal which drives the carriage actuator 4 in the direction appropriate for properly centering the actuator 4 over the coarse seek track 3.

Once the actuator 4 is centered over the coarse seek track 3, (as will be discussed in detail below with regard to reading data from the disk 1 surface) the device read circuitry can determine which coarse seek band 2 the actuator 4 is located over. If the device is not over the desired band 2, the device can signal the actuator 4 to move a predetermined distance, approximating the distance to the desired coarse seek track 3 and associated band 2. The coarse seek movement is controlled by a circuit (not shown) that counts coarse tracks 3 crossed as the actuator 4 moves. This circuit derives the track 3 crossings from the previous coarse position signal. In order to accomplish a coarse seek, a command is given to the coarse seeking servo system to initiate a seek of the desired length. As the actuator 4 is moved, the track 3 crossing circuit counts down until the desired coarse track 3 is reached.

READ OPTICAL PATH

Figure 7:
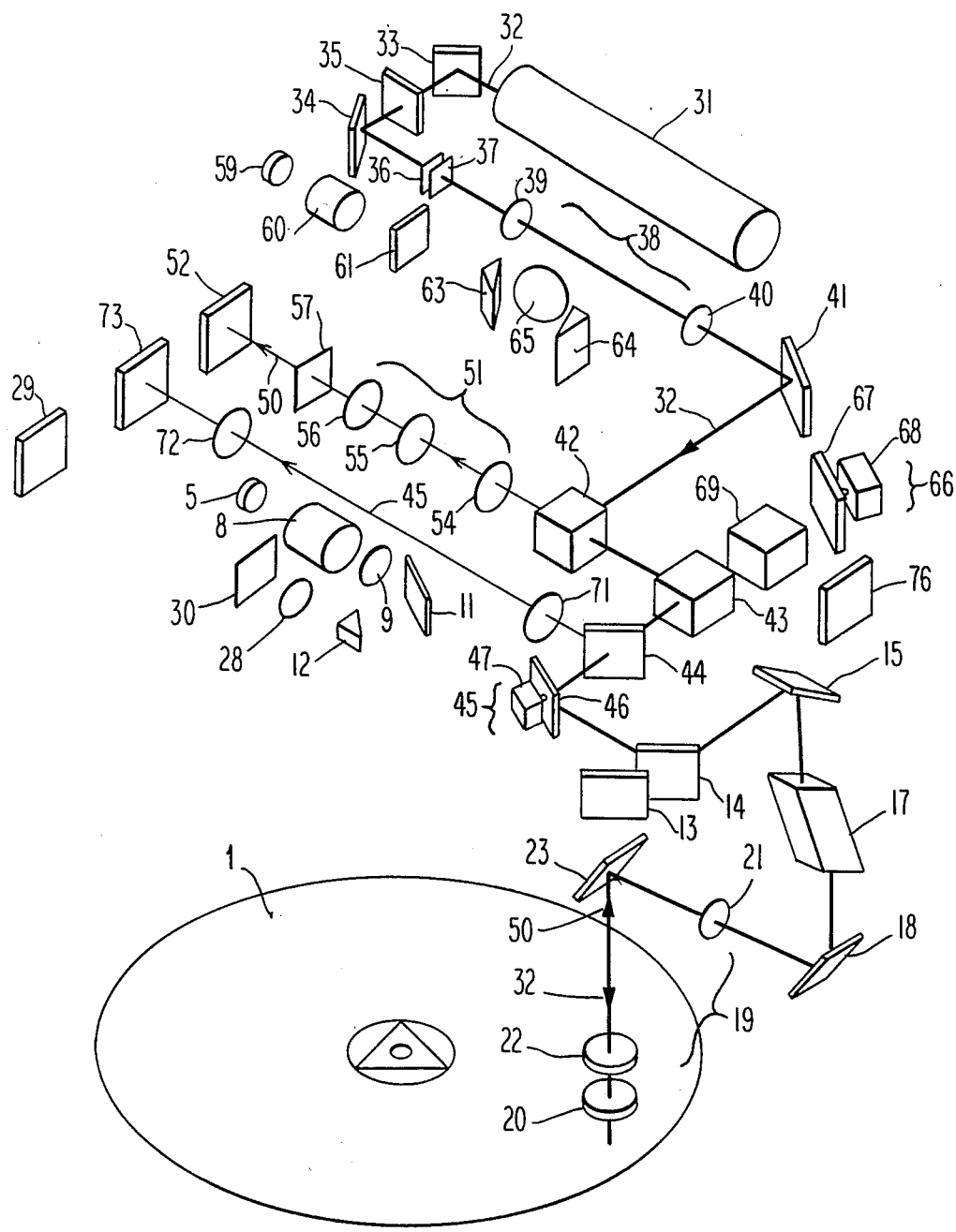
FIG. 7 is a perspective representation of the coarse seek, read, and write elements of the optical train specifically showing optical path of the read beams moving from the read laser to the disk surface, with the reflected read beams returning to a read, tracking and focus detector array.

As shown in FIGS. 3 and 7, the helium neon laser 31 emits a second, 633 wavelength, S-polarized beam 32. As shown in FIG. 7, in order to save space, the read beam 32 is reflected by a sixth planar mirror 33 and a seventh planar mirror 34, in order to fold the beam 32 back along its axis, but displaced longitudinally therein. A second, neutral density filter 35, having a density specifically selected for the output characteristics of the individual read laser 31 in the device is located in the read path in order to assure uniform power output in the read beam 32.

In the preferred embodiment, at least six read beams are used. These six beams are created by splitting the emitted, read beam 32 into six separate beams 32a-f. This is accomplished by means of a first 36 and a second 37 diffraction grating. The first diffraction grating 36 splits the incident read beam 32 into two first order beams. The second diffraction grading 37 splits each of the two beams from the first diffraction grading 36 into three beams, thereby creating a total of six beams. For simplicity, unless otherwise noted, the six beams will generally be referred to by numeral reference number 32, and a single read beam will be illustrated. Therefore, the net effect of the diffraction gratings 36 and 37 is to form an array of six beams from the single beam neon helium laser 31.

As shown in FIGS. 3 and 7, the six read beams 32 thereafter enter into a second telescope lens system 38. This second telescope lens system 38 serves two purposes. The first purpose is to image the collimated read beams 32 onto the radial tracking actuator system 45 described below. The second purpose is to expand the read beams 32 for transmission through the read path optical train. This second telescope system 38 works in conjunction with the first telescope system 19 to provide, at the entrance pupil of the objective lens, a set of read beams 32 having a diameter appropriate to match the diameter of the objective lens 20. The telescope lens system 38 is comprised of a third infinite conjugate doublet lens 39 having a focal length of 24 mm, and a fourth infinite conjugate doublet lens 40 having a focal length of 252 mm. The lens 39 and 40 are adjusted to provide the proper read beam imaging.

As shown in FIG. 7, the second telescope system 38 transmits the read beams 32 to an eighth planar mirror 41, which reflects the incident read beams 32 toward a first, polarization beamsplitter prism 42. This beamsplitter 42 reflects S-plane polarized beams and transmits P-polarized beams. Since the incident read beams 32 are S-polarized, they are reflected by the thin film coating on the interior diagonal of this polarization beamsplitter 42. The incident beams 32 thereafter impinge upon a second, wavelength selective beamsplitter 43. This beamsplitter combines the incident read beams 32 with an incident write beam. The second, wavelength beamsplitter 43 has a thin film coating on its interior diagonal which is designed to selectively reflect the read beam 32, but to selectively transmit the third wavelength of the device write beam (discussed below).

The deflected incident read beams 32 thereafter pass through the amplitude beamsplitter 44, where a portion of the read beam and as discussed below the write beams are diverted off onto what will be hereinafter referred to as the write alignment optical path 45, and will be discussed in detail below. However, the main portion of the beams 32 passes through the amplitude beamsplitter 44 and is directed upon the fine seek radial tracking actuator 45, which is comprised of a ninth planar mirror 46 and a first galvonometer 47. The actuator 45, deflects the read beams 32 (and, as discussed below, the write beam) through minute angular displacements to provide radial tracking over the disk 1 surface. The read beams 32, reflected from the ninth planar mirror 46, are directed to the first wavelength selective beamsplitter 14, which, as discussed above with regard to the coarse seek beam 6, selectively reflects the second, read wavelength beam 32, but transmit the first coarse seek wavelength 6. Therefore, after emerging from the wavelength selective beamsplitter 14, the read 32 and the coarse seek beam 6 thereafter share a common optical path, including reflection off the third planar mirror 15, passing through the rhomb prism 17.

The rhomb 17 will transmit and rotate the polarization of a light of a wide frequency range. The rhomb 16 is oriented such that its end faces are normal to the path of the incident coarse seek beam 6. The rhomb 17, through the process of total internal reflection, introduces a 90 degree relative phase difference between the two orthogonal field components of the incident coarse seek beam 6. Thus, after two internal reflections, the incident plane polarized read beams 32 emerge from the rhomb 17 as circularly polarized beams. Since the retardance is essentially independent of frequency over a large range, the rhomb 17 is essentially an achromatic 90 degree retarder. The circularly polarized incident read beams 32 thereafter are reflected off a fourth planar mirror 18. This planar mirror 18 is oriented so as to deflect the incident read beams 36 along with the coarse seek beam 6 from a vertical to a horizontal path.

The read beams 36 then reflect off the fourth planar mirror 18, to impinge upon the first telescope system 19. The purpose of this system 19 is to modify the incident coarse seek beam 6 diameter, such that its diameter matches the entrance pupil of the objective lens 20, passing through the first achromatic doublet 21, reflecting off the fifth planar mirror 23, and passing through the second 23 infinite conjugate achromatic doublet 22, to finally be focused upon the disk 1 surface by the objective lens 20.

As shown in FIG. 8c, the read spots 48a-f are focused on the present track 49b and the previous adjacent track 49a. The incident read beams 32 are modulated by the reflective pattern recorded on the tracks 49a and 49b. Spots 48a-c are "read present track" spots. The first spot 48a is used to provide focus information for all the read spots 48a-f and to read recorded data. The second and third spots 48b and 48c are used to provide read beam 32 tracking information. Spots 48d-f are "read previous track" spots. The fourth spot 48d, is also used to sense data recorded on the previous track 49a. The fifth and sixth read spots 48e and 48f, are used to track on the previously written adjacent track 49a, and are used when the present track 49b is being written. The six read spots 48a-f have different positions on the tracks 49a and 49b because the read beams 43 pass through the objective lens 20 at slightly different angles.

As shown in FIG. 7, the reflected read beams 50 are all transmitted back through the objective lens 20, the second and first infinite conjugate doublets 22 and 21, off of the fifth planar mirror 23, exiting the coarse seek actuator 4, to be thereafter reflected off the fourth planar mirror 18 to pass through the rhomb prism 17. When the reflected read beams 50 pass through the rhomb prism 17, one orthogonal axis is again retarded, so that when the reflected read beams 50 emerge from the rhomb prism 17, the beams 50 are again plane polarized, but with a 90 degree shift to be P-plane polarized.

The reflected read beams 50 then impinge upon the third planar mirror 15, which directs the beams 50 to the first wavelength selective beamsplitter 14. The first wavelength selective beamsplitter 14 reflects the second wavelength, read beams 50. The beams 50 are thereafter reflected by the ninth planar mirror 46, of the fine tracking actuator system 45, to pass through the amplitude beamsplitter 44, thereafter passing back through the second, wavelength selective, beamsplitter 43. Beamsplitter 43 reflects the read beams 50 toward the second polarization beamsplitter 42. Since the reflected read beams 50 now have a P-polarization, the second polarization beamsplitter 42 transmits the read beams 50. The read beams 50 thereafter pass through an astigmatic focusing lens system 51 which focuses the reflected read beams 50 onto a read/focus/track detector array 52. As shown in FIG. 9, the array 52, having located thereon, nine individual detector elements 52a–i. As shown in FIGS. 3 and 7, the astigmatic lens system 51, is comprised of a third achromatic doublet 54 having a focal length of 240 mm, a third spherical lens 55 having a negative focal length of 125 mm, and a second cylindrical lens 56 having a positive focal length of 250 mm. The third achromatic doublet 54 and the third spherical lens 55 cooperate to the read beam 50 image on to the second cylindrical lens 56. The second cylindrical lens 56 receives the circular cross-sectioned read beams 50 from the third spherical lens 55 and introduces an astigmatism into the reflected read beams 50.

As is well known in the art, when a detector is placed at the circle of least confusion in an astigmatic focus system, and a light beam is properly focused on a reflecting surface, a circular pattern is focused on the detectors. However, when the read beams are out of focus on the surface, an elliptically shaped pattern is formed. As shown in FIG. 9, this second detector 80 is comprised of four photosensitive elements 52a–d arranged in a quad pattern and wired for summing and differential signals (not shown). When the objective lens 20 is in the proper position, the image of the read spots 48a–f are in focus and as shown in FIG. 10a, a circular pattern 77 falls on the detectors 52a–d, so there is equal output from all four detectors 52a–d. However, when out-of-focus in a first direction or a second direction, an elliptical pattern falls on the detector. FIG. 10b shows out-of-focus elliptical pattern 78 in a first direction and FIG. 10c out-of-focus elliptical pattern 79 in a second direction. These differential signals are processed by well known circuitry (not shown), which sends a servo control signal to the focus actuator 26, which in turn moves the objective lens 20 to the proper focus distance.

As shown in FIG. 8c, tracking spots 48b and c are each positioned equidistantly on either side of the present track 49b. They indicate whether the read/focus spot 48a a is properly centered on the track 49b. As shown in FIGS. 7, 9 and 10, if the two spots 48b and c are not symmetrically located on track 49b, a radial error signal is generated and a correction signal is sent to the radial fine tracking actuator 45, to radially align the read spots 48a–f on the tracks 49a and 49b. Third and fourth detectors 52e and f are placed so as to fully receive the images of the first and second tracking spots 48b and 48c.

Figure 13:
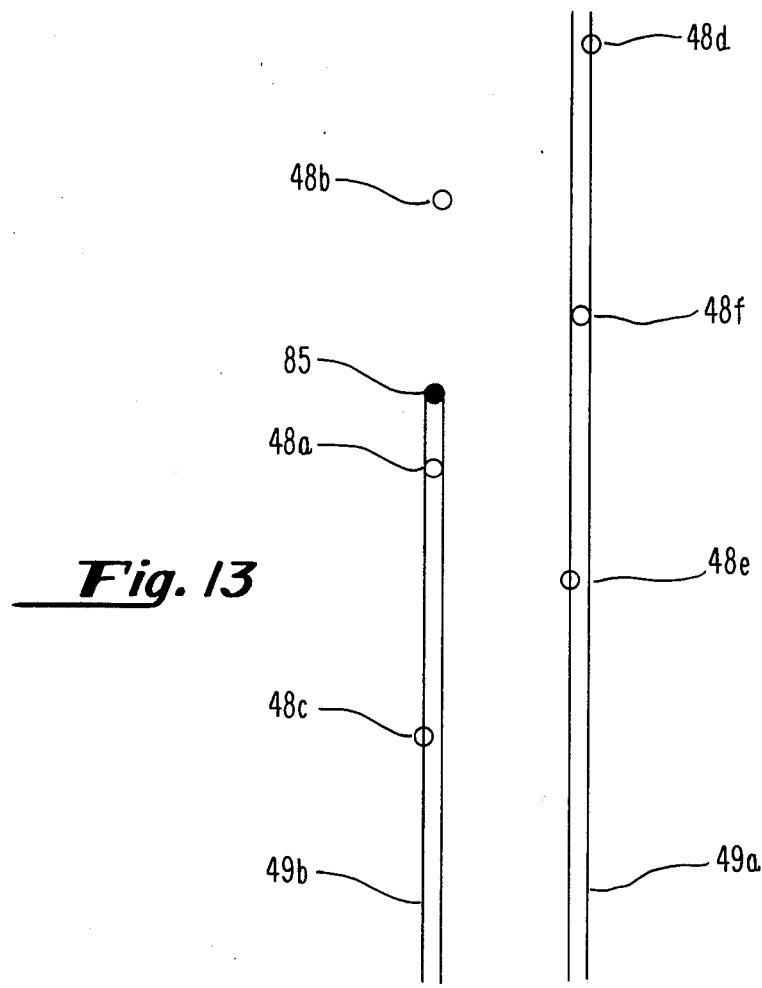
FIG. 13 shows an information track as it is being written with the adjacent, previously written, track used for maintaining proper write spacing.

As shown in FIG. 13, it will be necessary to track on the previous track 49a when present track 49b is first being written. Therefore, two additional tracking beams 48d and 48e are used. The additional tracking spots 48d and 48e are positioned equidistantly on either side of the previous track 49a. They are symmetrically offset so that each is half on and half off the track 49a. They are used to indicate if the read spots 48 are centered over the tracks 49a and 49b. Beams 48d and 48e are imaged upon tracking detectors 52g and 52h and provide a tracking signal from the previous track 49a, and also double as a check on proper tracking. If the two spots are not symmetrically placed on track 49a, a radial error signal is sensed by the track detectors 52g and 52h and a correction signal is sent to the radial tracking actuator 45. The actuator mirror 46 is pivoted to radially align the read spots 48 to the disk 1.

In this preferred embodiment, the sixth read spot 48f and the sixth detector 52i are used for reading data from the previous track 49a.

Disposed between the second cylindrical lens 56 and the detector array 52 is a third wavelength selective filter 57 for transmitting the read beams 50, but filtering out any stray third wavelength write beam 58 which may have entered the reflected read beam 50.

WRITE OPTICAL TRAIN

Figure 11:
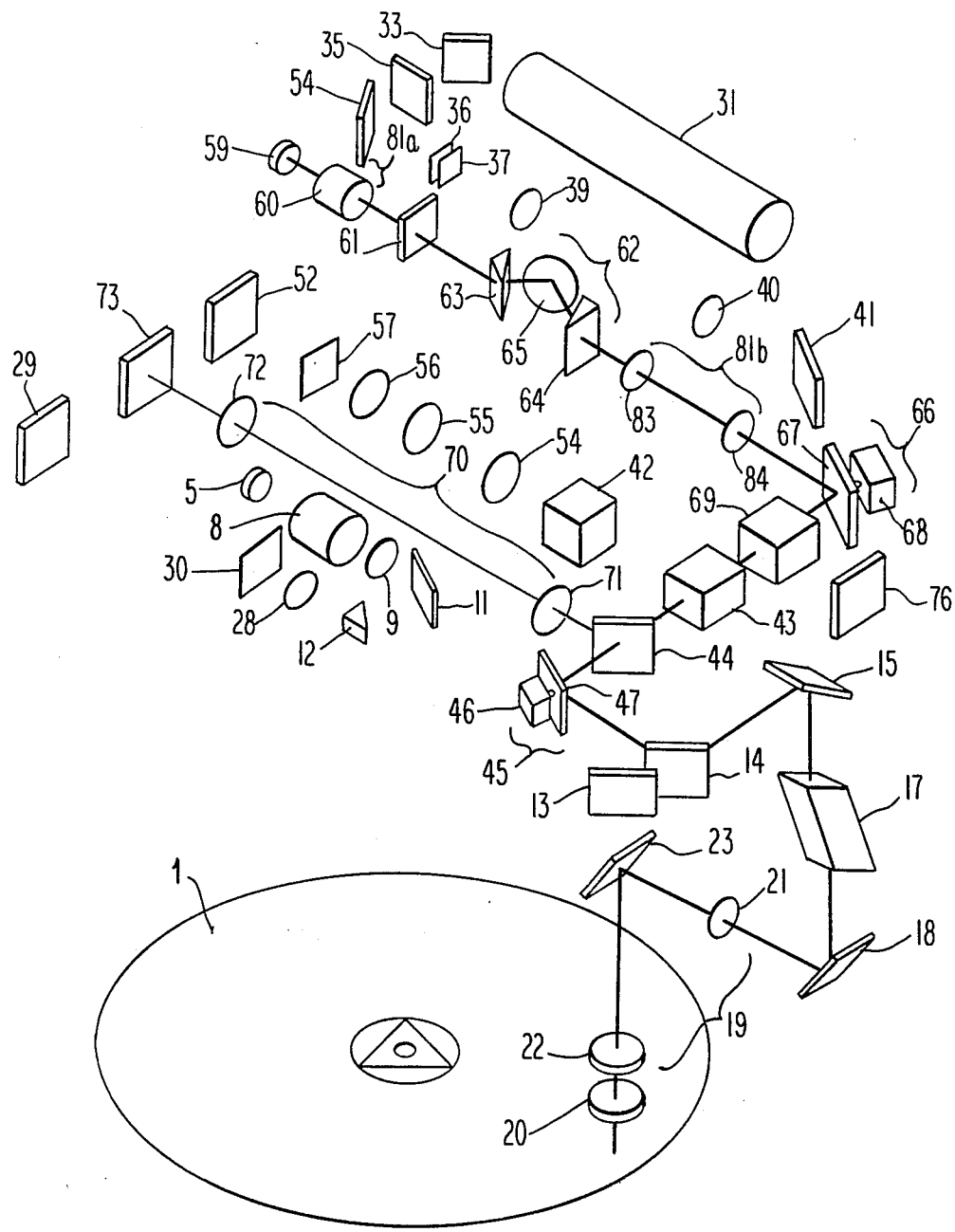
FIG. 11 is a perspective representation of the coarse seek, read, and write optical train elements in the preferred embodiment of the disclosed invention, the figure specifically showing the write beam optical path from the write diode laser to the disk surface.

As shown in FIGS. 3 and 11, the write beam 58 is produced by a third laser 59, producing a P-plane polarized, 835 nanometer, third wavelength, beam 58. The beam 58 produced by the laser diode 59 is divergent, astigmatic and has an elliptical cross section. Prior to writing data, the write beam 58 must be collimated, de-astigmatized and given a circular cross section. The write laser 59 output is modulated in accord with the information to be recorded, and it is of sufficient power to cause a data mark to be written on the disk 1 surface.

The write beam 58 is partially collimated by means of a fourth compound spherical lens 60 acting as the first portion of the third collimating lens system 81, hereafter referred to as the first write beam collimating subsystem 81a. In the preferred embodiment, the fourth compound spherical lens 60 has a numerical aperture of 0.60 and an entrance pupil diameter of 4.22 mm. The partially collimated write beam 58 emerges from the fourth compound spherical lens 60 to pass through an optical shutter 61 whose function shall be discussed in detail below.

As shown in FIGS. 3 and 11, after exiting the optical shutter 61, the still elliptical cross-sectioned beam 58 enters a combined beam cross-section/de-astigmatizing system 62 comprised of: a first, triangular-shaped transmissive prism 63; a second triangular-shaped light transmissive prism 64, and a tenth planar mirror 65. The tenth mirror 65 is disposed between the fourth and fifth transmissive prisms 63 and 64.

When a partially collimated beam enters a planar surface at a non-normal angle, the beam's minor cross-section axis is expanded. The first prism 63 is oriented with its entrance face at a non-normal angle relative to the path of the incident write beam 58. The planar mirror 65 is positioned to receive the write beam 58 as it exists the first prism 63 to reflect it toward the second prism 64. The second prism's 64 entrance face also receives the write beam 58 at a non-normal angle. In the preferred embodiment, first and second prisms 63 and 64 each provide approximately one-half the expansion necessary to completely circularize the beam 58. When the beam 58 exits the second prism 64, the beam 58 is expanded to a circular cross-section.

In the preferred embodiment, the combined system 62 is also used to de-astigmatize the beam 58 produced by the diode laser 59. When a partially collimated beam passes through a planar surface at a non-normal angle, one of the orthogonal focus points of the beam is shifted. In the past, this has presented a problem, requiring either nearly perfectly perpendicular incident angles, nearly perfectly collimated beams or both. However, this system 62 advantageously uses this feature. By precisely selecting and orienting the prisms 63 and 64, the combined system 62 can compensate for the original astigmatism in the beam 58. The prisms 63 and 64 are oriented to correct for the specific astigmatism of the write diode laser 59.

The partially collimated and de-astigmatized beam 58 is then incident upon the second collimating subsystem 81b, which fully collimates the beam 58 and expands the diameter of the write beam 58 for transmission through the remainder of the write optical train. In the preferred embodiment the second collimating subsystem 81b is comprised of a fifth and sixth spherical lens 83 and 84, having focal lengths of 40 mm to 50 mm and 120 mm to 148 mm respectively.

The now fully expanded, collimated and de-astigmatized write beam is incident upon a write alignment servo actuator system 66. This servo system 66 is comprised of an eleventh planar mirror 67 and a second galvonometer 68. Together the mirror 67 and galvonometer 68 serve to align the write beam 58 with the read beam 32. The details of the operation of which will be discussed in detail below.

The incident write beam 58 then enters a second polarization beamsplitter 69, which has a thin film coating along its interior diagonal surface, which transmits P-polarized light, but reflects S-polarized light. This beamsplitter prism 69 is used to prevent any write beam 58 which is reflected by the disk 1 surface from traveling back along the write optical path to re-enter the write laser diode 59 cavity. Any such return light would cause destructive resonance in the diode laser 59 and decrease the write efficiency.

The P-polarized incident write beam 58 exits the second polarization beamsplitter 69 to enter the second, wavelength selective beamsplitter 43 where the write beam 58 is combined with the read beams 32. As discussed above, the wavelength selective beamsplitter 43 selectively transmits the wavelength of the write beam 58 and selectively reflects the wavelength of the read beam 32. Therefore, the write beam 58 is transmitted undeviated through the second beamsplitter 43 and the read beam 32 is reflected off the dielectric surface. Both beams 32 and 58 exit the wavelength selective beamsplitter 43 sharing the same optical path, and thereafter optical train elements.

Figure 12:
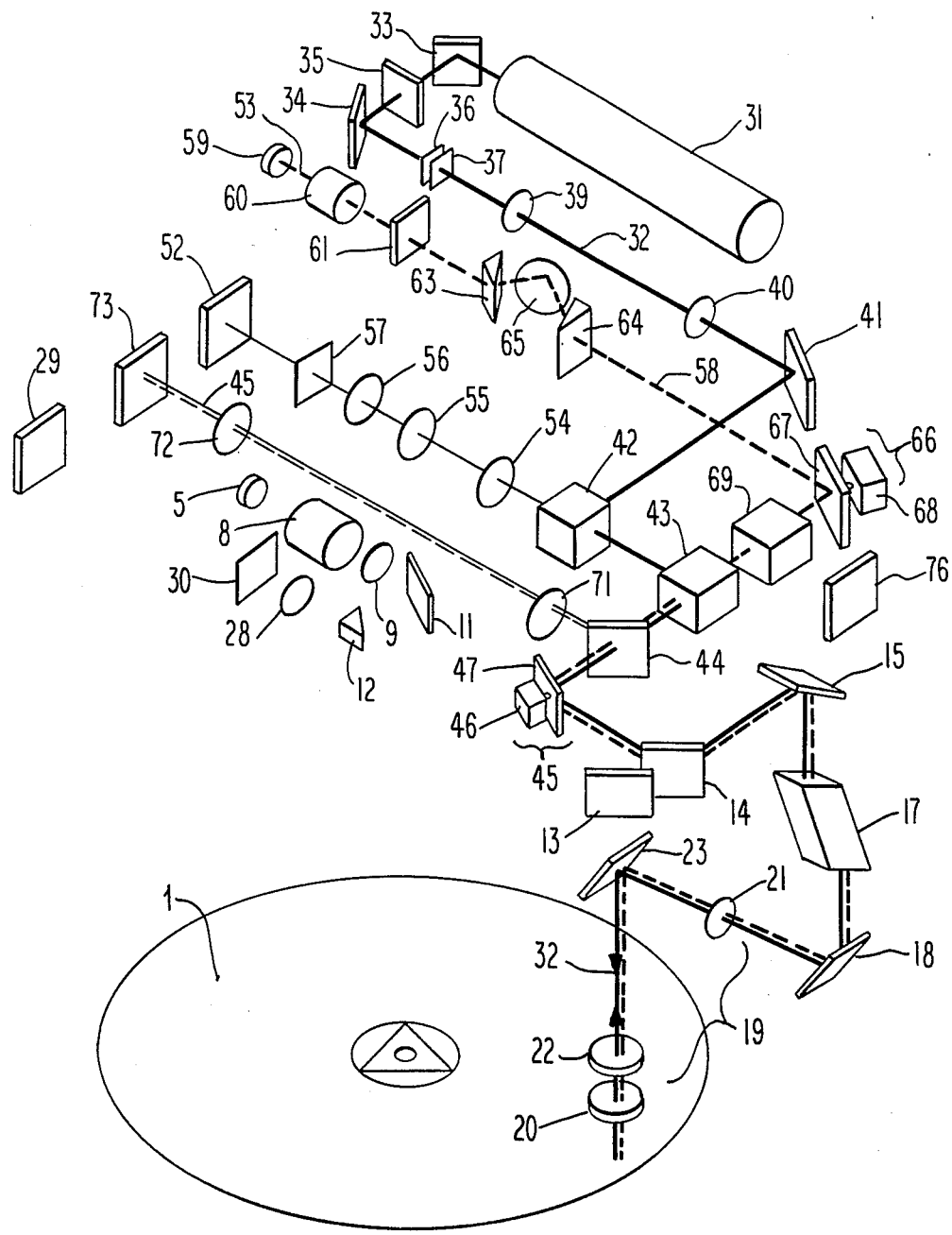
FIG. 12 is a perspective representation of the coarse seek, read, and write optical path elements in the preferred embodiment of the disclosed invention, said figure specifically showing the combined read and write optical train elements, particularly pointing out the write alignment feature of the disclosed invention.

As shown in FIG. 12, upon exiting the wavelength selective beamsplitter 43, the read 32 and write 58 beams impinge upon the amplitude beamsplitter 44. As discussed above, this beamsplitter 44 selectively deflects a small portion of both the read 32 and the write beams 58. The beams 32 and 58 are split off for the purpose of correcting the relative alignment of the write beam 58 with the read beams 32, so that the write beam 58 will write data on the present track 49b with the proper spacing from the previously written track 49a.

Figure 8:
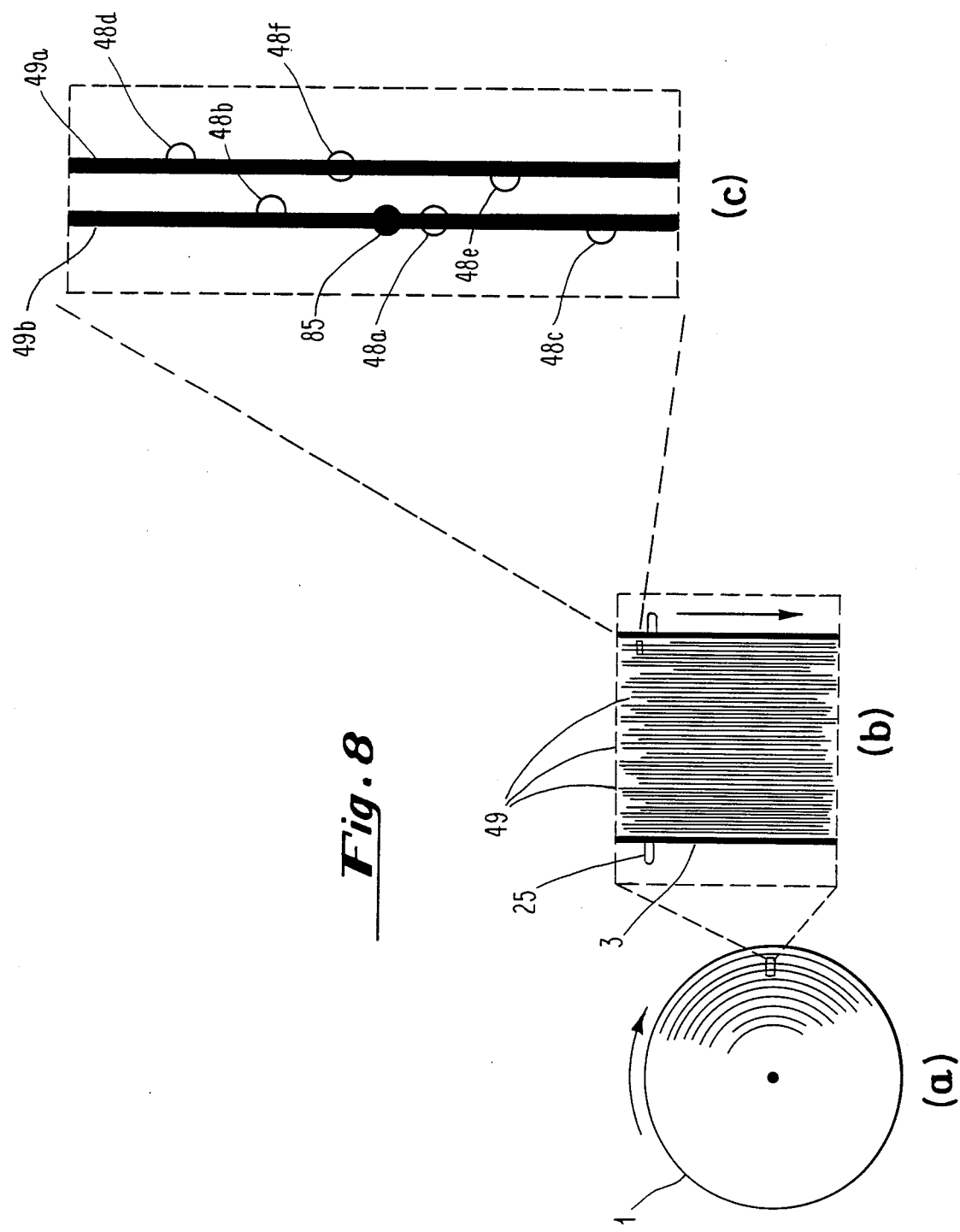
FIGS. 8a-8c are successively expanded sections of the disk surface.

The deflected read 32 and write beam 58 pass through a write alignment lens subassembly 70 which is comprised of a seventh spherical lens 71, having a positive focal length of 240 mm, and an eighth spherical lens 72, having a negative focal length of 49 mm. In the preferred embodiment, the two spherical lenses 71 and 72 are spaced approximately 250 mm from each other to operate as a single telephoto lens with an effective focal length of 1,000 mm. Together, these lenses image the beams 32 and 58 on a write alignment detector 73. The write alignment detector 73 senses the radial misalignment of the write beam 58 with respect to the read beam 32, and is well known in the art. In the preferred embodiment, United Detector Technology, Model PN SC-4D is used. In the preferred embodiment, the detector 73 is placed in a position to receive light from read spot 48a of the read spots 48a-f. As shown in FIGS. 8 and 13, on the disk surface, the write spot 85 writes one track 49b away from the previous track 49a, which in the preferred embodiment is a distance of approximately 1.4 microns.

Figure 14:
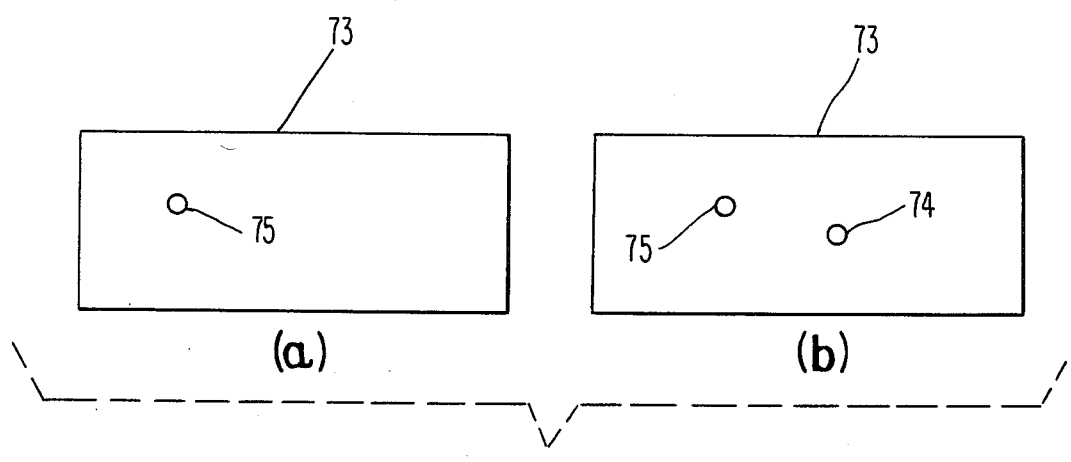
FIGS. 14a and 14b are pictorial representations of the write alignment detector in the preferred embodiment of the disclosed invention.

In operation, the proper spacing of the write alignment write spot 74 with regard to the write alignment read spot 75 is permanently stored in the write alignment signal processing device (not shown). As shown in FIG. 14a, prior to writing data, the read beam 32 alone is turned on and the write alignment read spot 75 is detected on the write alignment detector 73. Thereafter, the write laser 59 is turned on with the optical shutter 61 switched on to decrease the power of the write beam 58 in the write optical path, so as not to burn out the write alignment detector 73. As shown in FIG. 14b, the write alignment write spot 74 is close enough to the write alignment read spot 75 for both images to appear on the write alignment detector 73 where a measure of the relative distance between them is registered. If the two spots 74 and 75 are properly aligned, the shutter 61 electronics are signaled, the shutter 61 opens, and the full write power is available at the disk 1 surface. If the two spots 74 and 75 are not aligned, the write alignment detector 73 electronics send an error signal to the write alignment actuator 66.

As shown in FIGS. 12 and 13, in operation, should any write beam 58 return along the write optical path, the rhomb prism 17 will also rotate the polarization of the reflected write beam 58, such that when the reflected write beam 58 enters the second polarization beamsplitting prism 69, said beam 58, now having an S-polarization, will be reflected out of the write optical path, to be intercepted by the absorber 76 which will absorb any reflected write beam 58.

We claim:

1. A light beam transmitting optical head, for recording digital data on, and reading digital data from, a radiation reflective disk in an information storage and retrieval device, said disk having a plurality of concentric coarse servo tracks preformatted on the disk surface, and further having a preformatted home address track associated with each coarse servo track, said home address tracks uniquely identifying the information recording band between each set of coarse servo track, said home address tracks uniquely identifying the information recording band between each set of coarse servo tracks, said optical head having a coarse seek, read and a write optical train, wherein the coarse seek optical train is comprised of:

a first wavelength coherent light source, said light source forming the coarse seek beam;

means for producing a line-focused coarse seek beam for focusing the coarse seek beams on the coarse seek tracks on the disk surface;

means for the coarse seek radial translation of the coarse seek beam over the disk surface, said means positioning the coarse seek beam over the disk band containing the tracks designated to be written upon or read from;

means for focusing the coarse seek beam onto the disk surface, said means disposed in a coarse seek radial translation means and comprised of an objective lens, said objective lens disposed in an objective lens focus translation means, said objective lens focus translation means moving the objective lens in a direction normal to the plane of the rotating disk, said objective lens focus translation means disposed in the coarse seek radial translation means disposed in the coarse seek radial translating means;

means for splitting the incident coarse seek beam from the coarse seek beam reflected from the coarse servo tracks on the disk surface;

the first wavelength coherent light source further placed off-center with respect to the center optical axis of the objective lens, the incident coarse seek beam displaced upward to follow a first upper path through a first, upper subaperture of the objective lens, and the reflected course seek beam displaced downward to pass back through the second, lower subaperture of the objective lens, the deflected coarse seek beam following a lower path back through the coarse seek optical train;

a subaperture mirror placed to receive the incident coarse seek beam following the upper path and reflect same toward the disk, but such that the reflected beam follows the lower path and passes undeflected below the subaperture mirror;

means for focusing the reflected coarse seek beam onto a coarse seek beam detection means, said focusing means positioned to receive the coarse seek beam upon said beam being split from the incident coarse seek beam; and a coarse seek beam detection means, said detection means generating a signal in response to the radial position of the coarse seek beam over the coarse servo tracks.

2. A coarse seek optical train as recited in claim 1, wherein the coarse seek translation means is comprised of a linear motor, said linear motor having an actuator magnetically connected to a winding in a linear motor, and having a cavity for passage of the coarse seek beams.

3. A coarse seek optical train as recited in claim 2, wherein the means for focusing the reflected coarse seek beam onto a coarse seek detector is comprised of a second spherical lens.

4. A coarse seek optical train as recited in claim 3, wherein the coarse seek beam detector means is comprised of a first detector system, said detector system having a first, two-dimensional detector element such that said first detector generates a position signal in response to the coarse seek beam position over the coarse servo tracks, said reflected image generating a control signal which provides information to drive the actuator so as to center the actuator and therefore objective lens over the coarse seek track in order that the device can fine seek to and read the home address track, to thereby determine the device coarse seek radial position over the disk surface.

5. A light beam transmitting optical head, for recording digital data on, and reading digital data from, a radiation reflective disk in an information storage and retrieval device, said disk having a plurality of concentric coarse servo tracks preformatted on the disk surface, and further having a preformatted home address track associated with each coarse servo track, said home address tracks uniquely identifying the information recording band between each set of coarse servo tracks, said optical head having a coarse seek, read and a write optical train, wherein the coarse seek optical train is comprised of:

a first wavelength coherent light source, said light source forming the coarse seek beam;

means for producing a line-focused coarse seek beam for focusing the coarse seek beams on the coarse seek tracks on the disk surface;

means for focusing the coarse seek beam onto the disk surface, said means disposed in a coarse seek radial translation means;

means for the coarse seek radial translation of the coarse seek beam over the disk surface, said means positioning the coarse seek beam over the diskband containing the tracks designated to be written upon or read from;

means for splitting the incident coarse seek beam from the coarse seek beam reflected from the coarse servo tracks on the disk surface;

means for focusing the reflected coarse seek beam onto a coarse seek beam detection means, said focusing means positioned to receive the coarse seek beam upon said beam being split from the incident coarse seek beam;

a coarse seek beam detection means, said detection means generating a signal in response to the radial position of the coarse seek beam over the coarse servo tracks;

a first wavelength selective filter, said filter transmitting the first wavelength coarse seek beam, but absorbing a second and third read and write wavelength radiation beams respectively, thereby preventing said read and write beams from impinging on the first coarse seek, detector;

wherein the read optical train is comprised of means for producing a plurality of coherent light beams for reading data, providing focus information and providing tracking information, said coherent beams all having an S-plane polarization and of a second wavelength different from the first, coarse seek, wavelength;

means for collimating the read beams, such that the beams emerge from the collimating means precisely spaced from, and parallel to, one another;

means for focusing the incident read beams on the disk surface;

means for tracking of the read beams over the user tracks on the disk surface;

means for detecting the recorded data, said detector generating a signal representative of the data recorded thereon, and;

means for the radial translation of the read beams over the disk surface, said means positioning the read beam focusing means over the disk band to be read, said means coupled to the coarse seek beam radial translation means.

6. A read optical train as recited in claim 5, wherein the means for producing a plurality of read spots at the disk surface generates six such read spots at the disk surface.

7. A read optical train as recited in claim 6, wherein the means for producing six read spots is comprised of:

a laser, said laser emitting an S-plane polarized, second wavelength light beam;

a first grating, said grating splitting the incident read beam into a zero order beam, a positive first order beam, and a negative first order beam, and;

a second grating, said second grating splitting each of the beams from the first grating into a positive first order and a negative first order beam, the two gratings thereby combining to produce a six beam array.

8. A read optical train as recited in claim 7, wherein the first and the second grating are disposed in a back to back configuration so as to form a single assembly.

9. A read optical train as recited in claim 5, wherein the means for collimating the read beams is a second collimating telescope lens system.

10. A read optical train as recited in claim 5, wherein the means of providing for focus of the incident read beams on the disk surface is comprised of:
   the objective lens, said lens providing a point focus of the read beams on the disk surface, said objective lens disposed within a read beam objective lens focus translation means;
   means for splitting the incident read beams from the read beams reflected from the disk surface;
   means for focusing the reflected read beams onto a read beam focus detector means;
   means for detecting the reflected read beams;
   means for generating a servo control signal, said signal means receiving the output of the focus detector and providing a signal to drive a focusing servo motor, and;
   an objective lens focus translation means, said means moving the objective lens disposed in said objective translation means in an axis normal to the plane of the rotating disk.

11. A read optical train as recited in claim 10, further comprising of a means for adjusting the diameter of the read beam to optimally fill the entrance pupil of the objective lens, said objective lens focusing the read beams on the disk surface.

12. A read optical train as recited in claim 11, wherein the first and second spherical lens further provide the means for expanding the focus read beam to optimally fill the entrance pupil of the objective lens.

13. A read optical train as recited in claim 10, wherein the means for splitting the reflected read beams from the incident read beams is comprised of:
   means for rotating the polarization of the read beams, said means positioned such that both the incident and the reflected focus read beams pass through said rotating means, and;
   a first polarization sensitive beamsplitter, such that upon initially passing through said rotating means, the plane polarized read beams become circularly polarized and upon passing through the rotating means a second time, the circularly polarized read beams emerge plane polarized with each read beam now rotated 90 degrees relative to each read beams initial plane of orientation, and accordingly the incident read beams are reflected by the beamsplitter, and the reflected read beams are transmitted through the beamsplitter.

14. A read optical train as recited in claim 13, wherein the means for rotating the read beams is comprised of a rhomb prism, said prism having its end face oriented perpendicular to the path of the incident read beam.

15. A read optical train as recited in claim 10, wherein the means for focusing the reflected read beams onto the read beam detectors is comprised of an astigmatic focus system, said system receiving the reflected read beams and focusing said reflected beams onto a second, focus detector system, said astigmatic lens focus system producing two focal points in said reflected beams.

16. A read optical train as recited in claim 15, wherein the astigmatic focus system is comprised of:
   a first achromatic doublet lens as the entrance lens for the lens system;
   a second cylindrical lens as the exit lens, and;
   a third spherical lens, said lens positioned between the entrance and an exit lens.

17. A read optical train as recited in claim 10, wherein the means for detecting the reflected read beam is comprised of a second, focus detector system placed at the circle of least confusion, such that when the read beams are properly focused on the disk surface, a circular pattern is imaged on the detector, but when the disk is out of focus, an elliptical pattern is imaged on the detector, said second detector generating an electrical signal in response to the pattern illuminated on said detector.

18. A read optical train as recited in claim 17, wherein the second focus detector is a quad detector, said quad detector electrically connected so as to provide both summing and differential output signals for generation of focus control signals.

19. A read optical train as recited in claim 10, wherein the means for detecting the tracking read beams is comprised of:
   a third, tracking detector, generating an electrical signal in response to the tracking read beams incident thereupon, and;
   a means for focusing the tracking read spots onto the third tracking detector, said means receiving the beam from the read beam splitting means and focus said beam onto said detector.

20. A read optical train as recited in claim 19, wherein the third tracking detector system is comprised of a second and a third detector element, each detector element positioned to receive one of the reflected tracking beams, said detector elements generating an electrical signal to be processed by a tracking servo control means.

21. A read optical train as recited in claim 5, wherein the means for tracking the read beams over the user tracks is comprised of:
   a means for focusing a first and a second incident read tracking beam onto the disk surface;
   means for splitting the incident read tracking beams from the read tracking beams reflected from the disk surface;
   means for focusing the reflected read tracking beams onto a tracking detector means once said beams have been split from the incident beam;
   means for generating a tracking servo control signal, said signal means receiving the output of the tracking detector means, said signal means providing a signal to a servo motor, and;
   a beam tracking steering means, for radially positioning the read beams over the tracks.

22. A read optical train as recited in claim 21, wherein the beam tracking steering means is comprised of:
   a first planar mirror for angular deflection of the read beams:
   a first galvonometer having the first mirror attached thereto, said galvonometer moving the first planar mirror in response to a signal received from the third tracking detector system, and rotating said first planar mirror in accordance with the position of the tracking spots on the disk surface, moving said spots to correct for tracking misalignment.

23. A read optical train as recited in claim 5, wherein the means for detecting recorded data is comprised of a fourth detector system, said system generating a signal corresponding to the information contained in the read beam as modulated upon reflection on the disk surface, said read beam focused on the same track as are two tracking beams.

24. A read optical train as recited in claim 23, wherein the means for detecting recorded data is further comprised of a fifth detector system, said system generating a signal corresponding to the information contained in the read beam as modulated upon reflection by the disk surface said fifth detector system positioned to received beams reflected from the track previous to the track upon which the tracking beams are tracking upon.

25. A read optical train as recited in claim 24, wherein the read, focus and track detectors are combined into a single photo detector chip.

26. A light transmitting optical head as recited in claim 25, wherein the write optical train is comprised of:
   means for producing a write beam for writing data on the disk surface, said beam modulated in response to the information to be recorded, and having sufficient power to write the data on the disk surface, and of a third wavelength, said third wavelength different from the first coarse seek wavelength and the second read wavelengths, and said write beam having a P-plane polarization;
   means for collimating the write beam;
   means for focusing the write beam onto the disk surface;
   means for the coarse seek radial translation of the write beam radially over the disk surface, said translation means positioning the objective lens over the disk band to be written upon, and;
   a means for the fine seek radial translation of the write beam radially over the disk surface, said means positioning the write beam over the track location to be written upon.

27. A write optical train as recited in claim 26, wherein the means for collimating the read beams is comprised of:
   a first collimating subsystem, said first subsystem having a fourth compound spherical lens, said lens partially collimating the incident write beam, and;
   a second collimating subsystem, said second subsystem having a fifth and a sixth spherical lens, said fifth and sixth spherical lens receiving the partially collimated write beam and fully collimating same.

28. A write optical train as recited in claim 26, wherein the means for reforming the elliptical cross section of the write beam to a circular cross section is comprised of;
   a first prism, said prism receiving the incident beam, partially expanding said beam;
   a second prism, said prism receiving the beam from the first prism, and;
   a second planar mirror, said mirror disposed between the first and second prisms and oriented to receive the partially expanded write beam and deflect the write beam to the second prism so that the fully expanded exiting write beam follows the same optical path as the entering write beam.

29. A write optical train as recited in claim 26, wherein the means for focusing the read beams on the disk surface is further comprised of the means for focusing the write beam on the disk surface.

30. A write optical train as recited in claim 26, wherein the means for expanding the read beams to fill the entrance pupil of the objective lens further comprises the means for expanding the write beam to fill the entrance pupil of the objective lens.

31. A write optical train as recited in claim 26, wherein the read beams coarse seek translation means further comprises the write beam coarse seek translation means.

32. A write optical train as recited in claim 26, wherein the means for radially aligning the write beam with respect to the read beams, such that when the device is writing data on a new track location, the radial spacing of the new track written is precisely spaced from the previous track, the precise alignment attained by aligning the write beam with the read beams prior to data being written on the disk in the new track location.

33. A write optical train as recited in claim 31, wherein the read beam track steering means further comprises the write beam track steering means.

34. A write optical train as recited in claim 33, wherein the means for radially aligning the write beam with respect to the read beams is comprised of a means for combining the incident write beam with the incident read beams such that the read beams and the write beams share a single optical path upon emerging from the beam combining means, said combining means also splitting the reflected read beams from the reflected write beams, such that the reflected read beams and the reflected write beams follow separate optical paths upon re-emergence from the beam combining means.

35. A write optical train as recited in claim 34, further comprising a means for preventing any reflected write beam from traversing back through the write optical chain to enter into and interfere with the light beams emitted by the write laser.

36. A write optical train as recited in claim 35, wherein a means for preventing any reflected write beam from traversing back through the write optical chain to enter into and interfere with the light beams emitted by the write laser is comprised of:
   a means for rotating the polarization of the write beam;
   a third polarization beamsplitter, and;
   an absorber, for absorbing the reflected write beam, such that the incident write beam is transmitted through the beamsplitter and onto the write optical path to impact the disk surface while any reflected write beam is reflected of the beamsplitter onto the absorber.

37. A write optical train as recited in claim 36, wherein the means of combining/splitting the incident read beam with the write beam is comprised of a first, wavelength selective, beamsplitter, said beamsplitter selectively reflects the second wavelength read beams and selectively transmits the third wavelength write beams, such that the incident read beams enter the beamsplitter and are reflected and the incident write beam enters the beamsplitter to pass through without deflection, so that the read beams and write beams are combined upon emerging from the device sharing a single optical path.

38. A write optical train as recited in claim 37, wherein the means for radially aligning the write beam with respect to the read beam for the purpose of write beam alignment is comprised of:
   an amplitude beam splitter, said beam splitter transmitting a relatively large fraction of the incident read and write beams toward a read beam track steering means, and reflecting a relatively small fraction of the read and write beams, toward a means for detecting the alignment of the write beams with respect to the read beams;

means for focusing the incident read beams and the write beam which have been split from the respective main beams onto the means for detecting the alignment of the write beam with respect to the read beams;

means for detecting the alignment of the write beam with respect to the read beams, said detecting means sensing the position of a selected read beam, and the position of the write beam, generating a servo control signal to precisely align the write beam relative to the selected read beam;

a write alignment radial translation means for radially aligning the write beam relative to the read beam in response to a servo control signal generated by the write alignment detection means, and;

a shutter, said shutter disposed in the path of the write beam, for selectively reducing the power of the write beam during the write alignment process.

39. A write optical train as recited in claim 38, wherein the write optical path is further comprised of a second wavelength selective filter, said filter transmitting the first read wavelength and absorbing the third write wavelength, said second filter disposed in the reflected read path so as to prevent the reflected write beam from impinging on the read detectors.

40. A write optical train as recited in claim 39, wherein the write beam alignment detection means is comprised of a sixth, two dimensional, photodetector, such that initially the read beam is focused on said detector, the signal generated by the position of the read beam alone on the detector transmittal the write beam then focused on the detector, the combined signal noted, with the difference between the two processed to provided an error signal for the generation of a signal, said signal driving the write radial alignment translation means for correct alignment of the write beam with the read beam.

* * * * *